United States Patent [19]

Hans et al.

[11] Patent Number: 4,544,168
[45] Date of Patent: Oct. 1, 1985

[54] SEAL BETWEEN ROTATING CONCENTRIC ELEMENTS

[75] Inventors: Rüdiger Hans, Niederwerrn; Wolfgang Friedrich, Schweinfurt, both of Fed. Rep. of Germany

[73] Assignee: SKF Kugellagerfabriken GmbH, Schweinfurt, Fed. Rep. of Germany

[21] Appl. No.: 700,497

[22] Filed: Feb. 11, 1985

Related U.S. Application Data

[63] Continuation of Ser. No. 647,991, Sep. 6, 1984, abandoned, which is a continuation of Ser. No. 507,559, Jun. 24, 1983, abandoned.

[30] Foreign Application Priority Data

Jun. 26, 1982 [DE] Fed. Rep. of Germany ... 8218351[U]

[51] Int. Cl.4 .................. F16J 15/32; F16J 15/34
[52] U.S. Cl. .................................. 277/84; 277/49; 277/152; 277/164; 277/166; 277/178; 277/186
[58] Field of Search .................... 277/48, 49, 82, 84, 277/152, 153, 164, 166, 178, 181–186, 189

[56] References Cited

U.S. PATENT DOCUMENTS

| | | | |
|---|---|---|---|
| 2,316,713 | 4/1943 | Procter | 277/153 |
| 3,075,779 | 1/1963 | Holdham | 277/186 X |
| 3,195,902 | 7/1965 | Tisch | 277/203 X |
| 3,526,441 | 9/1970 | Schulz | 277/92 X |
| 4,304,412 | 12/1981 | Ladin | 277/183 X |

FOREIGN PATENT DOCUMENTS

| | | | |
|---|---|---|---|
| 1017868 | 10/1957 | Fed. Rep. of Germany | 277/84 |
| 1075383 | 2/1960 | Fed. Rep. of Germany | 277/182 |
| 2023007 | 2/1971 | Fed. Rep. of Germany | 277/82 |
| 2414634 | 10/1974 | Fed. Rep. of Germany | 277/84 |
| 2421010 | 11/1975 | Fed. Rep. of Germany | 277/152 |
| 1139430 | 2/1957 | France | 277/153 |
| 1231867 | 4/1960 | France | 277/205 |
| 1327643 | 4/1963 | France | 277/152 |
| 609230 | 9/1960 | Italy | 277/95 |
| 581593 | 10/1946 | United Kingdom | 277/152 |
| 602746 | 6/1948 | United Kingdom | 277/152 |
| 2077371 | 12/1981 | United Kingdom | 277/152 |

Primary Examiner—Robert S. Ward
Attorney, Agent, or Firm—Yuter, Rosen & Dainow

[57] ABSTRACT

A sealing arrangement for two machine elements concentrically arranged with respect to one another for relative rotation, especially for the inner and outer bearing rings of a rolling bearing, consists of a holding ring circumferentially arranged spring fingers radially snappable in an annular groove in the outer or inner ring, and a sealing seal of an elastically compressible plastic connected thereto, the holding ring being adapted to be axially inserted between the inner and outer bearing rings. In order to maintain a precise centering of the seal connected to the holding ring, between the outer and inner ring, the holding ring has spring fingers on its axially outer end and a centering section on its axially inner end. The centering section is radially supported in the bore of the outer ring or on the outer surface of the inner ring. The seal has a mounting section which is axially clamped between the centering section and a radially extending inner shoulder of the outer or inner ring, adjacent the bore of the outer ring or the outer surface of the inner ring.

16 Claims, 4 Drawing Figures

SEAL BETWEEN ROTATING CONCENTRIC ELEMENTS

This is a continuation of application Ser. No. 647,991, filed Sept. 6, 1984, now abandoned, which in turn is a continuation of Ser. No. 507,559, filed June 24, 1983, now abandoned.

This invention relates to a sealing arrangement for two machine elements arranged for rotation with respect to each other, especially the inner and outer rings of a rolling bearing.

In a known sealing arrangement of this type a holding ring is provided which has spring fingers on one end that are radially snappable in an annular groove in one of the bearing rings. The centering of the holding rings and the seal connected to the holding ring by an injection molding process, is effected by supporting the ends of the spring fingers in the annular groove. A great disadvantage of this known sealing arrangement lies in the fact that the spring fingers are supported in a nonuniform manner in the groove, due to their respective different lengths, bending and spring tension, so that a harmful warping of the holding ring about its circumference can occur. In addition, the bottom of the annular groove, on whcih the spring fingers are supported in part, must be precisely machined, so that the seal is concentrically held between the outer and the inner ring. The preparation of the outer and inner ring is consequently expensive.

It is therefore an object of the present invention to provide a sealing arrangement of the above type, in which a precise centering of the seal connected to the holding ring may be obtained without requiring the precise machining of corresponding annular grooves in the outer or inner rings.

In accordance with the invention, the holding ring is firmly centered in the machine bore of the outer ring or on the outer surface of the inner ring, by means of its centering section. The seal connected to the holding ring is consequently firmly held without eccentric misalignment and thereby its free end can sealingly slide on the inner or outer ring, or form a narrow sealing gap therewith. As a consequence the annular groove, which can be produced before the hardening of the outer or inners by recess turning, need not be machined after the hardening. In the assembly of the holding ring and the seal connected thereto on the outer ring or on the inner ring, the assembly of the holding ring and seal is axially inwardly pressed until the spring fingers snap radially into the annular groove of the inner or outer ring. The establishment of the centering of the holding ring in the bore surface of the outer surface or on the outer surface of the inner ring is thereby achieved. Moreover the mounting section of the seal is elastically clamped against the inner shoulder of the outer or inner ring. As a result of the spring force of the mounting section of the seal, the holding ring is fixed in the axially outward direction and axially held with the outer end of the spring fingers abutting the outer boundary edge of the annular groove.

In a further feature of the invention, the spring fingers of the holding ring press initially against the outer edge of the groove, upon forcing the holding ring in the outer ring or on the inner ring in the axially inward direction, and consequently they are bent radially away from the annular groove. Upon further inward forcing of the ring, the spring fingers finally reach a position aligned with the annular groove and snap radially into the groove. In a still further feature of the invention the advantage arises that the holding ring is mounted relatively easily with its centering portion on the respective centering surface in the bore of the outer ring or on the outer surface of the inner ring. In a still further feature according to the invention the mounting section of the seal is held in the axial direction relatively weakly and elastically yielding, so that the remaining section of the seal can be made stiff, so that it is not warped upon the assembly and insertion of the holding ring.

In further features of the invention, recesses are provided on the end surface of the mounting surface of the seal. The holding ring may additionally provide stiffening for the seal.

In another feature of the invention, additional stiffening of the seal is provided so that, moreover, a protection of the seal against hitting, for example, upon the axial inwardly pressing of the holding ring, is provided.

In order that the invention will be more clearly understood, it will now be disclosed in greater detail with reference to the accompanying drawings, wherein.

Figure 1:
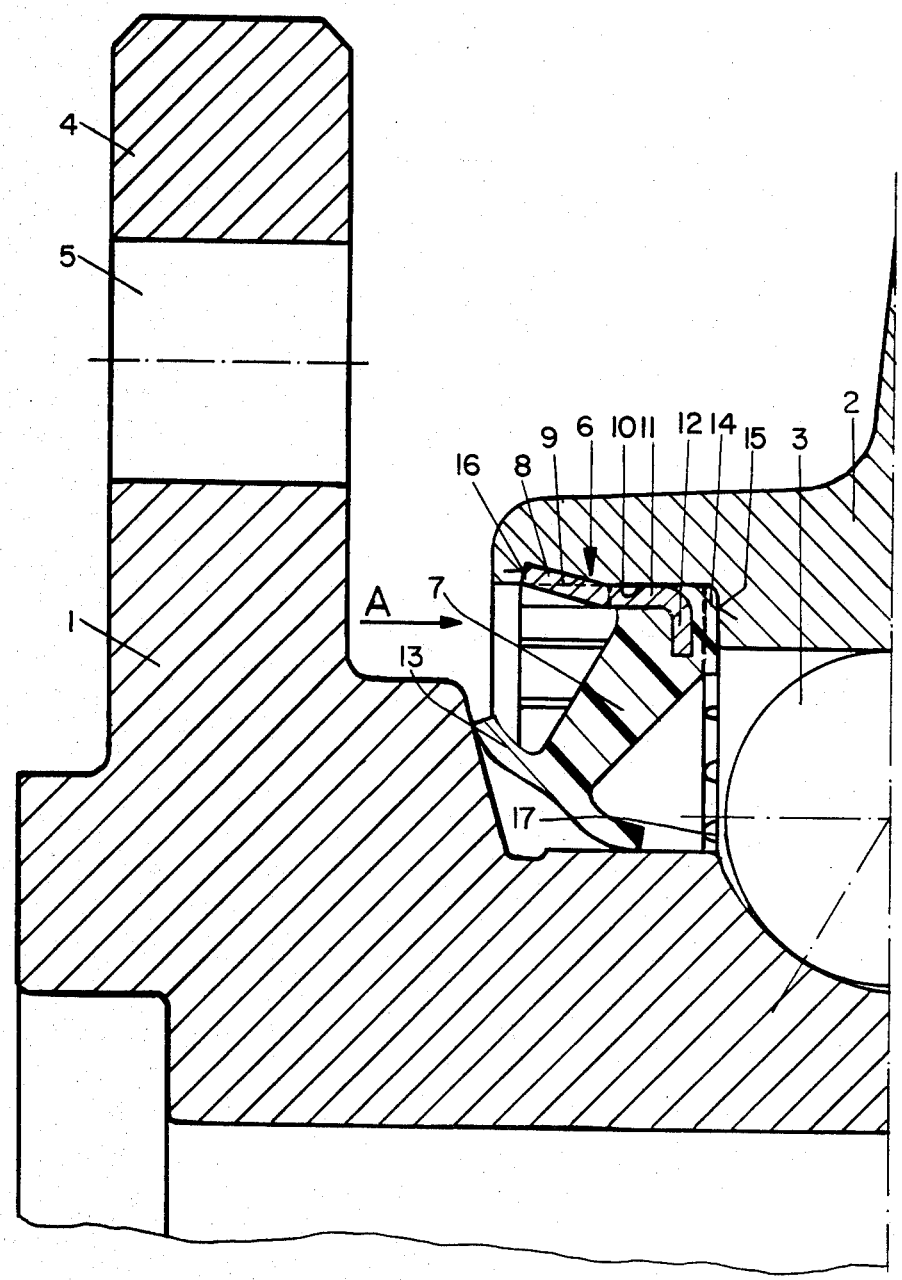
FIG. 1 is a partial longitudinal section through a sealing arrangement arranged on one side of a rolling bearing, in accordance with the invention.

Referring now to the drawings, FIG. 1 illustrates a rolling bearing arrangement having an inner ring 1 and an outer ring 2. The inner and outer rings 1, 2 are relatively rotatable parts of a rolling bearing. The rolling bearing in the illustrated case is comprised of two rows of balls 3 (only one of which is illustrated in FIG. 1), the balls 3 being arranged to roll in groove shaped races between the inner ring 1 and the outer ring 2 in known manner.

The inner ring 1 has a fastening flange 4 on one end, the flange 4 being provided with mounting holes 5 extending axially therethrough and distributed about its circumference. The rolling bearing may consequently be employed as a wheel bearing arrangement, with a wheel rim (not shown) affixed to the rotatable inner ring 1 by means of screws or the like (not shown) extending through the mounting holes 5. The respective non-rotatable outer ring 2 may be mounted on the frame (not shown) of a vehicle.

A holding ring 6 and a seal 7 are provided for sealing the bearing space of the rolling bodies 3, between the inner ring 1 and the outer ring 2. The seal 7 is of an elastically compressible plastic material, and is fixedly connected to the holding ring 6, for example, by an injection molding process.

Figure 2:
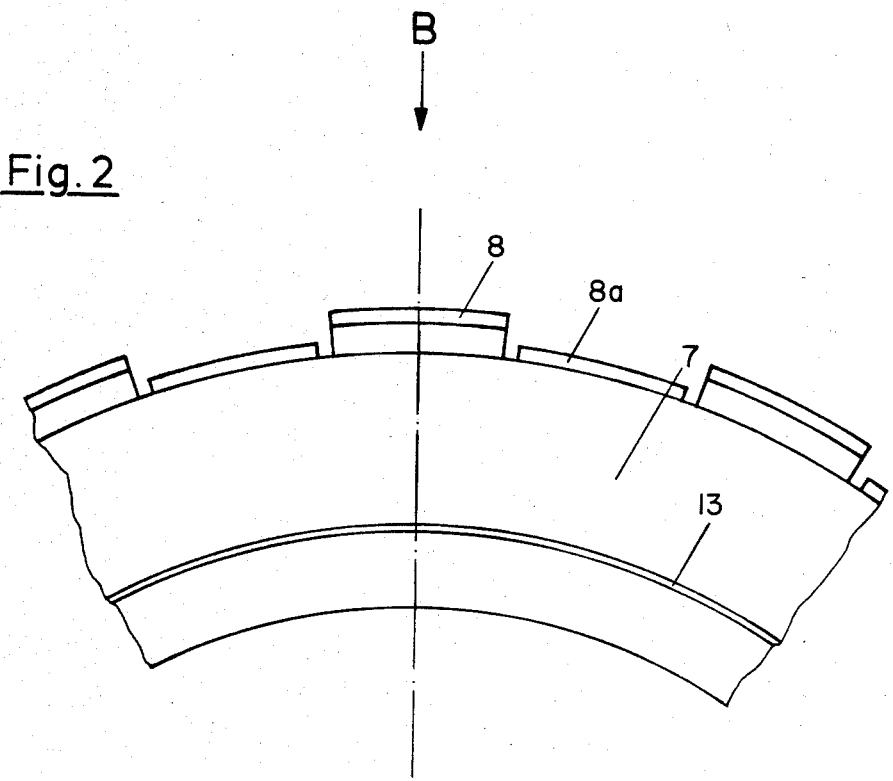
FIG. 2 is a side view of the holding ring of the sealing arrangement of FIG. 1, taken in the direction of the arrow A, the holding ring being illustrated in disassembled condition and having a seal connected thereto.
Figure 3:
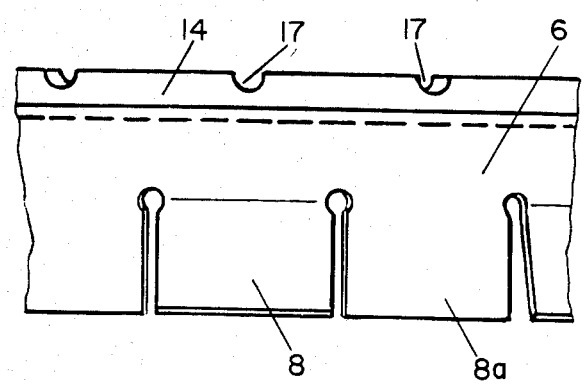
FIG. 3 is a view of the holding ring of FIG. 2, having a seal connected thereto, taken in the direction of the arrow B.

The holding ring 6 has several circumferential distributed spring fingers 8 and 8a (FIGS. 2 and 3) on its axially outer end. It shall be understood that the term "axially outer" refers to the direction toward the flange 4, and the term "axially inner" refers to the direction toward the balls 3. The free ends of the spring fingers 8 are conically outwardly directed, i.e., bent to extend obliquely outwardly with respect to the axis of the bearing, and arranged to be snapped in a groove 9 machined in the cylindrical bore surface 10 of the outer ring. Spring fingers 8a extend axially outwardly in a similar manner between each pair of conically outwardly extending spring fingers 8, the spring fingers 8a, however, defining a cylindrical surface. The groove 9 of the outer ring 2 has a continuously extending conical groove bottom bounding the bore surface 10 at its axially inner end. The free ends of the conically extending spring fingers 8 are supported axially outwardly in the annular groove 9.

The holding ring 6 has a cylindrical centering section 11 formed as a unit with the spring fingers 8 and 8a, on its axially inwardly directed side. This centering portion 11 is radially supported on the cylindrical bore surface 10 which adjoins the axially inner side of the annular groove 9. The holding ring 6 is prepared by a non-cutting process from a metallic band material. It has radially inwardly directed flange sections 12 on the axially inner end of the centering portion 11, the flange sections 12 being formed as a unit with the centering section 11 and connected thereto.

The seal 7 has two sealing lips 13 sliding on the inner ring 1, at the radially inner end of the seal. The radially outer end of the seal has a mounting section 14, which is axially clamped with prestress between the centering portion 11 and an radially inwardly projecting inner shoulder 15 of the outer ring 2 adjoining the bore surface 10. This mounting section 14 presses the end of spring fingers 8 against the boundary wall 16 of the annular groove 9, due to its elastic characteristics.

The mounting section 14 of the seal 7 has an axially inner end surface which is axially supported on the inner shoulder of the outer ring 2, and is provided with several equally circumferential distributed recesses. In this case the recesses are formed in this end surface by radially extending grooves 17. During the assembly of the holding ring 6 with the respective seal 7, this assembly is forced axially inwardly in the bore of the outer ring 2. The holding fingers 8 of the holding ring 6 engage the axially outer edge of the annular groove 9, and are elastically radially inwardly bent. Upon further forcing of the holding ring 6 in the outer ring 2, the mounting section 14 of the seal 7 becomes elastically compressed between the shoulder 15 and the flange section 12. At the same time the conical spring fingers 8 of the holding ring 6 snap into the annular groove 9 of the outer ring. Finally the axial force is released, so that the ends of the conical spring fingers 8 are axially outwardly pressed against the buondary walls 16 of the annular groove 9 due to the elastic characteristics of the mounting section 14.

Figure 4:
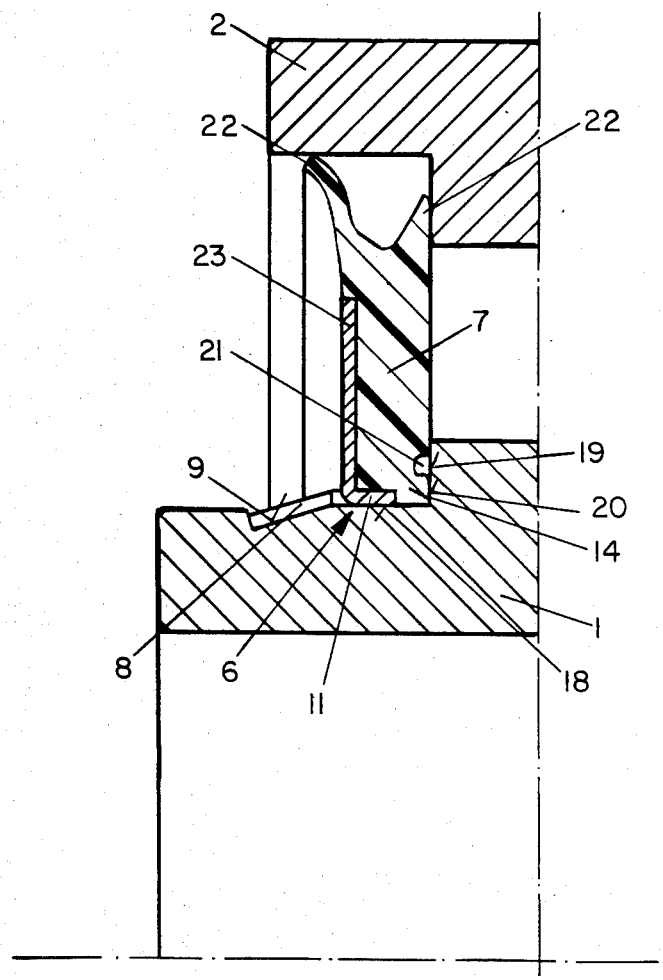
FIG. 4 is a partial longitudinal section through a modified sealing arrangement of the invention.

FIG. 4 illustrates a modification of the sealing arrangement, which, in the same manner as the arrangement of FIG. 1, seals the bearing space between an outer ring and an inner ring 1 concentrically arranged thereto. Also in the arrangement of FIG. 2, the holding ring 6 likewise has conically axially outwardly directed spring fingers 8 on its axially outwardly directed side and a centering portion 11, supporting the spring fingers 8 on its axially inwardly directed side. The seal 7 has a mounting section 14 of an elastically compressible plastic material. In this modification of the sealing arrangement the annular groove 9 is machined in the cylindrical outer surface 18 of the inner ring. The mounting section 14 is axially clamped with compression between the centering portion 11 and a radially outwardly projecting inside shoulder 19 of the inner ring 1 adjacent the outer surface 18.

The centering section 11 of the holding ring 6 is supported on the outer surface 18 of the inner ring, which axially inwardly bounds the annular groove of the inner ring 1.

The mounting section 14 of this seal 7 has an axially supporting end surface 20 abutting the inner shoulder 19 of the inner ring 1, this end surface 20 having a recess which is shaped, in this case, as a concentrically extending deep groove 21. The plastic material of the mounting section 14 is elastically compressed during the axially inwardly pressing of the holding ring 6 in the inner ring 1. As a consequence the plastic material of mounting section 14 is squeezed, in part, into the annular groove 21.

The seal 7 has two sealing lips 22 sliding in the bore of the outer ring 2, at the outer end of the seal 7. The seal 7 is moreover produced by injection molding and firmly connected to the holding ring 6 to form an inseparable unit.

The centering portion 11 of the holding ring 6 has stiffening fingers 23 on its axially outer end, the stiffening fingers being arranged in each case between adjacent pairs of conical spring fingers 8 of the holding ring 6. These stiffening fingers 23 are connected as a unit with the holding ring 6. they are radially outwardly directed, extending outwardly from the annular groove 9 of the inner ring, and being partly molded around by the seal 7 during the injection molding process so that they are firmly connected to the seal.

During the assembly of the holding ring 6 with the respective seal 7, the holding ring 6 is axially inwardly pressed in the inner ring 1, in a manner similar to that of FIG. 1. The mounting section 14 thereby engages the inner shoulder 19 of the inner ring and the conical spring fingers 8 snap radially inwardly into the annular groove 9, so that the holding ring 6 with its respective seal is held fast in the radial and axial direction on the inner ring 1.

The above described sealing arrangement can be modified within the scope of the invention. For example the holding ring can be provided with a flange section directed to extend radially from the annular groove and being unitarily formed on its axially inner end, and having additional radially outwardly directed stiffening fingers on its axial outer end and connected thereto. The annular groove can be roughly machined and have a suitable cross-section adapted to fit the spring fingers of the holding ring snapped thereinto. The seal can also be formed as a split seal element so that it forms a narrow radial and/or axial gap together with the flange of the otuer or inner ring to be sealed.

What is claimed is:

1. In a sealing arrangement for inner and outer rings that are rotatable with respect to one another, comprised of a holding ring having circumferentially distributed spring fingers on its end that are positioned to snap into and engage an annular groove in the surface of a bore in the outer ring upon the application of axially inward pressure to the holding ring; the improvement wherein the holding ring includes said spring fingers on its axially outwardly directed end and a centering portion on its axially inwardly directed end, said centering portion supporting said spring fingers and radially engaging said bore surface adjacent said groove and being radially supported in said bore of the outer ring adjacent said annular groove, and wherein a seal formed as a unit with said ring has an axially clamped mounting section clamped with compression between the centering portion and a radially extending inner shoulder of the outer ring adjacent the bore of the outer ring, said seal having a sealing section extending from said mounting section to form a sliding seal with said inner ring, the radially supported fit between said bore and said centering portion positioning said seal concentrically with the rotating axis of said machine elements.

2. The sealing arrangement of claim 1, wherein at least one of the spring fingers of the holding ring is directed with its free end extending conically axially outwardly and axially outwardly supported in the groove of the outer ring.

3. The sealing arrangement of claim 2, wherein the annular groove of the outer ring has a continuous conical shaped bottom boundary, with the bore of the outer ring on its axially inward side.

4. In a sealing arrangement for two concentrically arranged machine elements that are rotatable with respect to one another, comprised of a holding ring having circumferentially distributed spring fingers on its end that are positioned to snap into an annular groove in the surface of a bore in the outer ring upon the application of axially inward pressure to the holding ring; the improvement wherein the holding ring includes said spring fingers on its axially outwardly directed end and a centering portion on its axially inwardly directed end, said centering portion supporting said spring fingers and being radially supported in said bore of the outer ring adjacent said annular groove, and wherein a seal has an axially clamped mounting section clamped with compression between the centering portion and a radially extending inner shoulder of the outer ring adjacent the bore of the outer ring, the radially supported fit between said bore and said centering portion positioning said seal concentrically with the rotating axis of said machine elements, the mounting section of the seal having an axial supporting end surface with at least one recess formed therein abutting the shoulder of the outer ring.

5. The sealing arrangement of claim 4, wherein there are a plurality of said recesses and said recesses are formed by radial grooves on the end surface of said mounting section, said grooves being uniformly arranged about the circumference of said seal.

6. The sealing arrangement of claim 1 wherein the centering portion of said holding ring includes a flange extending radially away from said annular groove, and unitarily formed on the axially inner end of the holding ring, said mounting section being compressed between said flange and said inner shoulder.

7. In a sealing arrangement for two concentrically arranged machine elements that are rotatable with respect to one another, comprised of a holding ring having circumferentially distributed spring fingers on its end that are positioned to snap into a annular groove on the outer surface of an inner ring upon the application of axially inward pressure to said holding ring; the improvement wherein said holding ring includes said spring fingers on its axially outwardly directed end and a centering portion on its axially inwardly directed end, said centering portion supporting said spring fingers and being radially supported on the outer surface of the inner ring adjacent said annular groove, and wherein a seal has an axially clamped mounting section clamped with compression between said centering portion and a radially extending inner shoulder of said inner ring adjacent said outer surface of said inner ring, the radially supported fit between said outer surface and said centering portion positioning said seal concentrically with the rotating axis of said machine elements.

8. The sealing arrangement of claim 7, wherein the centering section of said holding ring includes stiffening tongue means extending radially away from said annular groove and unitarily formed on the axially outer end of the holding ring and arranged between said spring fingers.

9. The sealing arrangement of claim 1 wherein the holding ring is formed from a band material.

10. The sealing arrangement of claim 9 wherein the holding ring is of spring steel.

11. The sealing arrangement of claim 7, wherein at least one of said spring fingers of said holding ring is directed with its free end extending conically axially outwardly and axially outwardly supported in said groove of said inner ring.

12. The sealing arrangement of claim 11, wherein said annular groove of the inner ring has a continuous conical shaped bottom boundary with the outer surface of said inner ring on its axially inward side.

13. The sealing arrangement of claim 7 wherein said holding ring is formed from a band material.

14. The sealing arrangement of claim 13 wherein said holding ring is of spring steel.

15. In a sealing arrangement for two concentrically arranged machine elements that are rotatable with respect to one another, comprised of a holding ring having circumferentially distributed spring fingers on its end that are positioned to snap into an annular groove on the outer surface of an inner ring upon the application of axially inward pressure to said holding ring; the improvement wherein said holding ring includes said spring fingers on its axially outwardly directed end and a centering portion on its axially inwardly directed end, said centering portion supporting said spring fingers and being radially supported on the outer surface of the inner ring adjacent said annular groove, and wherein a seal has an axially clamped mounting section clamped with compression between said centering portion and a radially extending inner shoulder of said inner ring adjacent said outer surface of said inner ring, the radially supported fit between said outer surface and said centering portion positioning said seal concentrically with the rotating axis of said machine elements, wherein said mounting section of the seal has an axial supporting end surface with at least one recess formed therein abutting said shoulder of said inner ring.

16. The sealing arrangement of claim 15, wherein each said recess is an encircling groove on the end surface of the mounting section of the seal.

* * * * *